US012539655B2

United States Patent
Starkey et al.

(10) Patent No.: US 12,539,655 B2
(45) Date of Patent: Feb. 3, 2026

(54) RUNNER TURN-OFF FOR A MOLD

(71) Applicant: PROGRESSIVE COMPONENTS INTERNATIONAL CORPORATION, Wauconda, IL (US)

(72) Inventors: Glenn Starkey, Wauconda, IL (US); Sebastian Jurczak, Wauconda, IL (US); James Fattori, Trevose, PA (US)

(73) Assignee: PROGRESSIVE COMPONENTS INTERNATIONAL CORPORATION, Wauconda, IL (US)

( * ) Notice: Subject to any disclaimer, the term of this patent is extended or adjusted under 35 U.S.C. 154(b) by 72 days.

(21) Appl. No.: 18/655,514

(22) Filed: May 6, 2024

(65) Prior Publication Data

US 2025/0340001 A1    Nov. 6, 2025

(51) Int. Cl.
*B29C 45/30*    (2006.01)
*B29C 45/27*    (2006.01)

(52) U.S. Cl.
CPC .......... *B29C 45/30* (2013.01); *B29C 45/2703* (2013.01)

(58) Field of Classification Search
CPC ............................. B29C 45/30; B29C 45/2703
See application file for complete search history.

(56) References Cited

U.S. PATENT DOCUMENTS 4,909,725 A * 3/1990 Ward ................... B29C 45/2703
                                                 425/572
5,208,053 A    5/1993 Vandenberg

OTHER PUBLICATIONS

Cumsa, Barcelona, Spain, "Sprue Adjuster," CUMSA Catalog, Accessories, (2022) January, p. 157.

* cited by examiner

*Primary Examiner* — James Sanders
(74) *Attorney, Agent, or Firm* — Pauley Erickson & Swanson

(57) ABSTRACT

A runner turn-off for a mold. The runner turn-off includes a bottom ring and a top ring rotatable on the bottom ring. The runner turn-off has a generally cylindrical shape to allow for the rotation, and includes a machining flat on each of two opposing sides of the bottom ring and partially extending into the top ring. A plurality of detents is disposed in one of a bottom surface of the top ring or a top surface of the bottom ring. A spring plunger between the top ring and the bottom ring and configured to fit within each of the plurality of detents when aligned to provide more precise angular positioning.

19 Claims, 8 Drawing Sheets

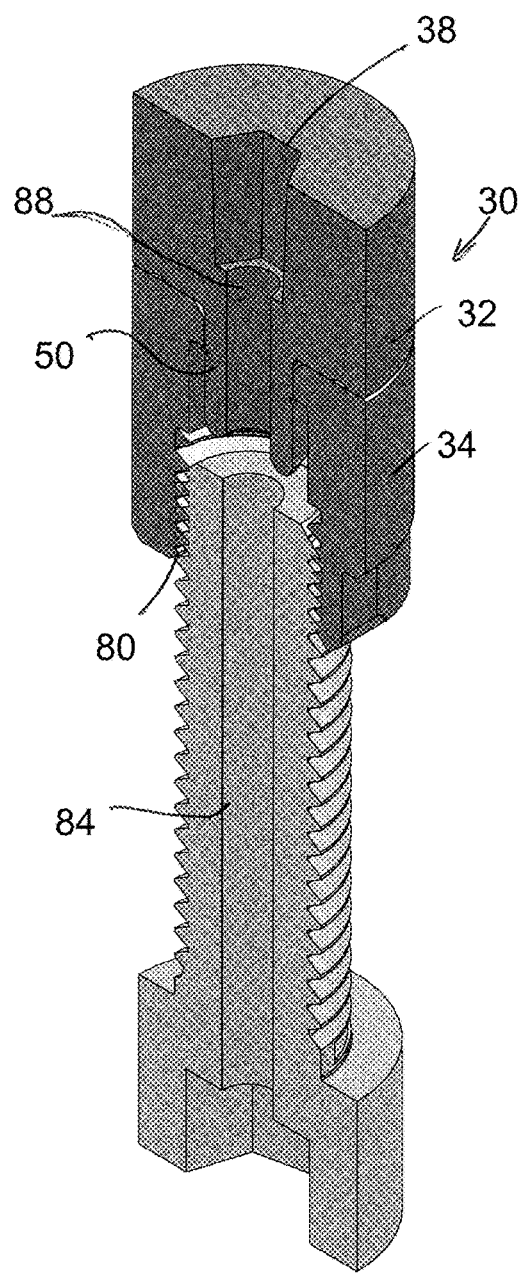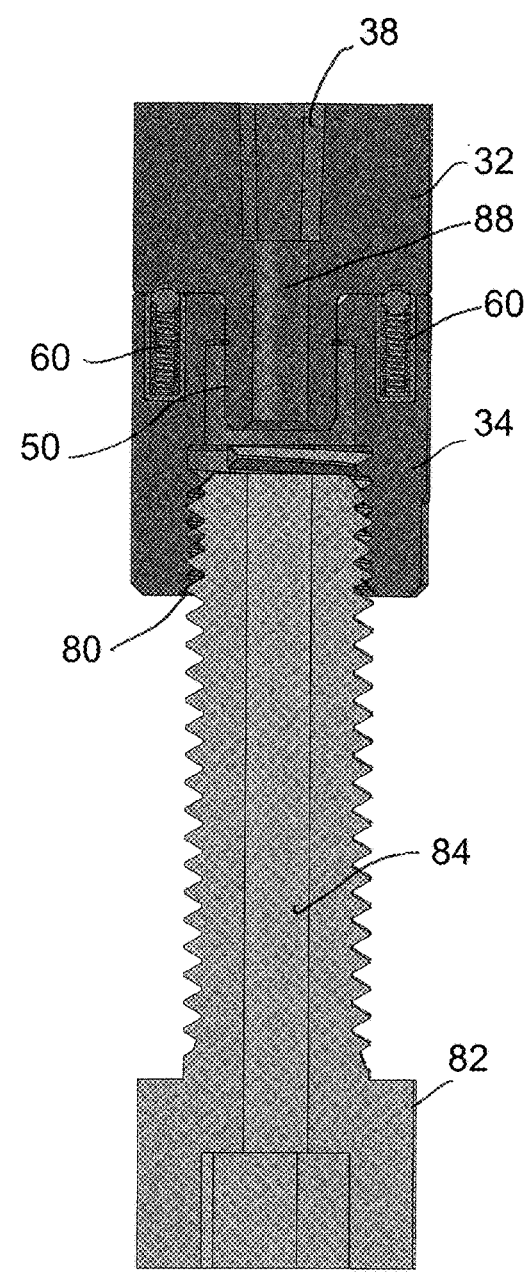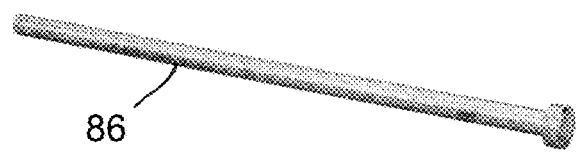
FIG. 7
FIG. 8
FIG. 9

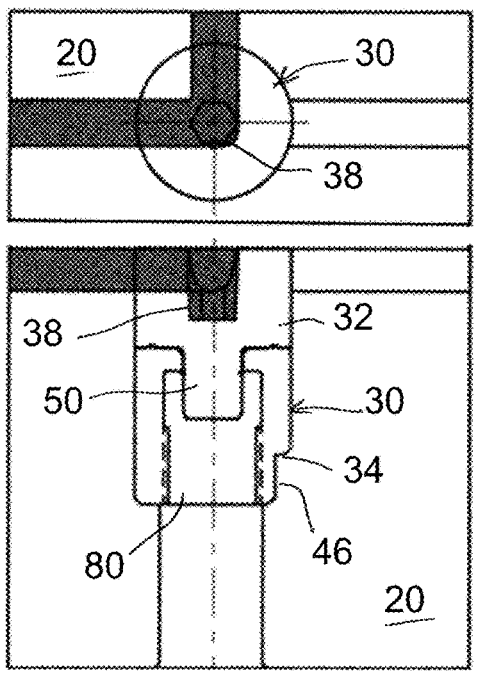
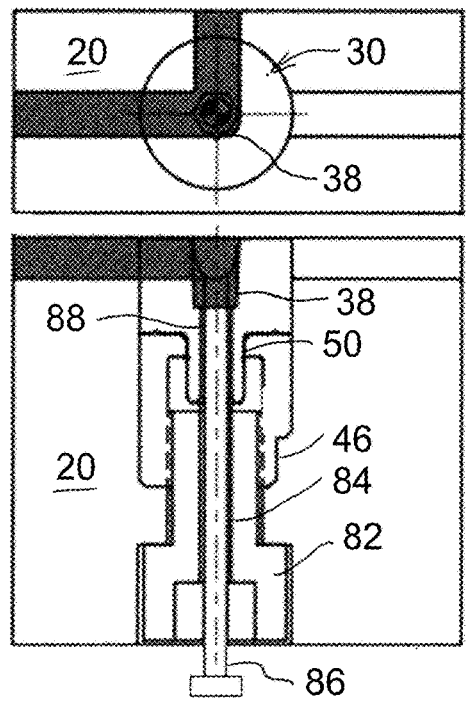
FIG. 10    FIG. 11
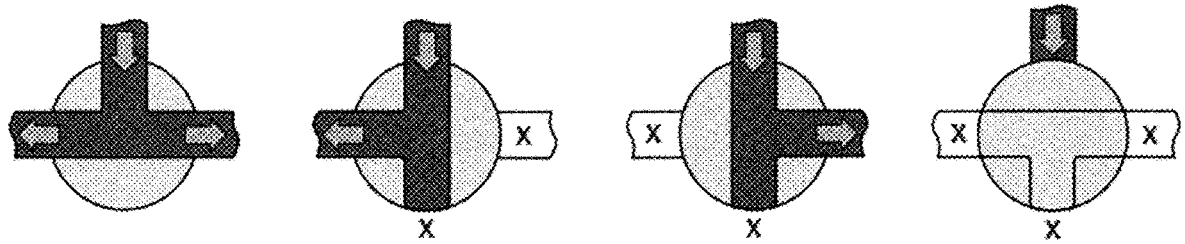
FIG. 12A    FIG. 12B    FIG. 12C    FIG. 12D
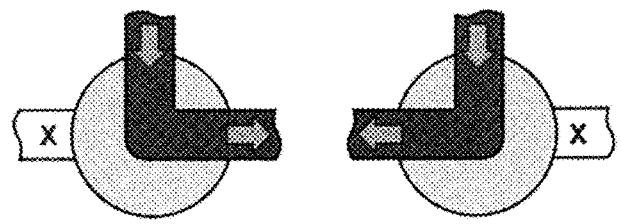
FIG. 13A    FIG. 13B

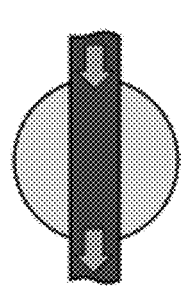
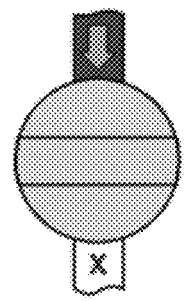
FIG. 14A　　　FIG. 14B
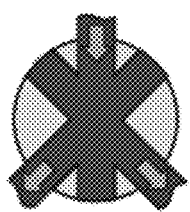
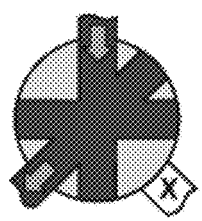
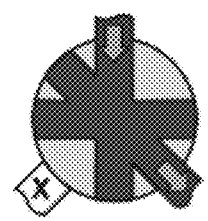
FIG. 15A　　FIG. 15B　　FIG. 15C
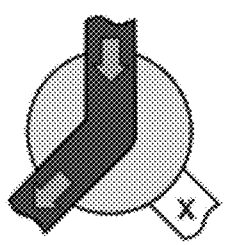
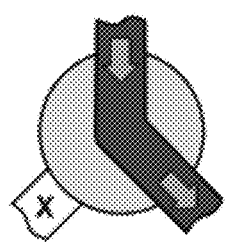
FIG. 16A　　FIG. 16B

RUNNER TURN-OFF FOR A MOLD

BACKGROUND OF THE INVENTION

This invention relates generally to controlling plastic flow in an injection mold and, more particularly, to a runner turn-off apparatus for opening and closing mold gates in mold installations.

A runner turn-off (RTO), also referred to as a runner shut-off or a sprue adjuster, is a cylindrical-shaped mold component that can be rotated to prevent the flow of molten material from continuing down its path, divert it to a different path, or both. RTOs are commonly located at the intersection of a runner branch. RTOs are commonly used in family molds, where one does not need all the different parts during every production run. Molding unneeded parts, and then throwing them out or grinding them up is anything but efficient.

One advantage to RTOs is that they eliminate improvised methods of blocking off a mold gate. It is common for a mold maker to just use a core pin, and put an O-ring around it to keep it from rotating, but that O-ring does not always do the trick, and rotates and cuts off material flow.

There is a continuing need for improved runner turn-off inserts for molding applications.

SUMMARY OF THE INVENTION

A general object of the invention is to provide a runner turn-off (RTO) device for a mold, having improved usage features. The RTO has a generally cylindrical shape, with a top section or "ring" that rotates relative to a bottom section or "ring." In embodiments, the RTO has an assembly with flat portions that allow a user to easily hold the RTO in a vise to machine the desired runner pattern. As the RTO has a rotatable top, the flat portions cross both elements to hold the top from rotating when milling the runner. In additional or alternative embodiments, the top ring has a number of preset rotation angles relative to the bottom ring, which assists in aligning the runner pattern in the desired configuration during use.

The general object of the invention can be attained, at least in part, through a runner turn-off (RTO) for a mold. The RTO includes a bottom ring and a top ring rotatable on the bottom ring. The RTO has a generally cylindrical shape with a machining flat on each of two opposing sides of the bottom ring and partially extending into the top ring. The top ring desirably includes an extension press-fit into an opening of the bottom ring. The top ring has a slightly smaller diameter than the bottom ring, such as less than 0.0005 inch The bottom ring is desirably press-fit into an opening in the mold. In embodiments, the bottom ring includes a registration structure, such as a press-fit alignment flat, optionally on a side between the two opposing sides.

The top ring desirably includes a hex or similar opening in a top surface to receive a hex tool or equivalent for rotating the top ring relative to the bottom ring. The top ring is machinable at the top surface to form runners across the hex opening for the mold material, and the hex opening extends into the top ring a predetermined distance to extend below the runners after machining.

In embodiments of this invention, the RTO includes a click-in-place rotatable top ring. This can be implemented by a plurality of detents disposed in a surface of one of the top or bottom rings. A counterpart shaped surface or ball, such as via a spring plunger, is between the top ring and the bottom ring and configured to fit into each of the plurality of detents when aligned. The plurality of detents are spaced at desired angular increments, such as at 45° increments, about a longitudinal axis of the runner turn-off.

In embodiments, the bottom ring includes a threaded opening on a side opposite the top ring. A threaded fastener corresponding to the threaded opening can be included for securing the bottom ring to the mold. The threaded fastener can include a longitudinal central passage for receiving an ejector pin configured to extend into the passage and contact the top ring.

The invention further includes a runner turn-off for a mold having a cylindrical body including a bottom ring and a top ring rotatable on the bottom ring. A plurality of detents is disposed in one of a bottom surface of the top ring or a top surface of the bottom ring. A spring plunger is between the top ring and the bottom ring, such as in the other of the bottom surface of the top ring or a top surface of the bottom ring, and has a rounded top surface or ball configured to fit within each of the plurality of detents when aligned. The plurality of detents are spaced at, for example, 45° increments about a longitudinal axis of the runner turn-off.

The invention further includes methods of using the RTO of this invention. Steps include: machining a runner pattern into a top surface of the top ring; press-fitting the runner turn-off into a mold; and/or turning the top ring relative to the bottom ring into a selected position to open and close runners in a runner pattern, wherein the spring plunger fits into one of the detents to align and/or secure the top ring in the selected position. Additional or alternative steps can include: inserting the ejector pin through the longitudinal passage to remove the top ring from the bottom ring; and/or threading a second and longer fastener to the bottom ring, wherein the second and longer fastener extends from the mold, and hitting the fastener to remove the runner turn-off from the mold.

Other objects and advantages will be apparent to those skilled in the art from the following detailed description taken in conjunction with the appended claims and drawings.

BRIEF DESCRIPTION OF THE DRAWINGS

FIGS. 7 and 8 illustrate a runner turn-off according to embodiments of this invention.

FIGS. 9 and 10 illustrate runner turn-off uses according to embodiments of this invention.

FIG. 11 shows an ejector pin according to one embodiment of this invention.

FIGS. 12A-D show a runner turn-off pattern and use according to embodiments of this invention.

FIGS. 13A-B show a runner turn-off pattern and use according to embodiments of this invention.

FIGS. 14A-B show a runner turn-off pattern and use according to embodiments of this invention.

FIGS. 15A-C show a runner turn-off pattern and use according to embodiments of this invention.

FIGS. 16A-B show a runner turn-off pattern and use according to embodiments of this invention.

DETAILED DESCRIPTION OF THE INVENTION

The present invention provides a runner turn-off (RTO) device or insert that provides a reliable position of material flow and/or is easy to machine. In embodiments, the RTO has click-in-place angular positioning, such as every 45°. In additional or alternative embodiments machining is straightforward with two flats provided, extending on both the top and bottom rings, to hold in place without risk of the top spinning.

Figure 1:
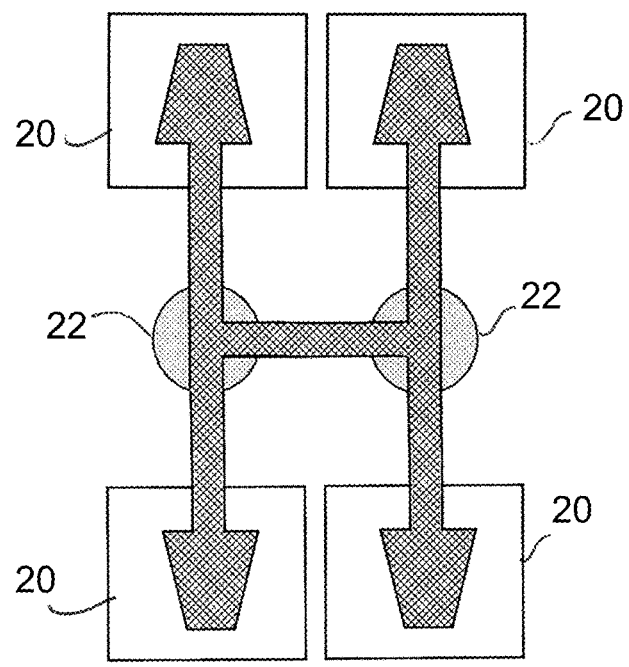
FIGS. 1 and 2 representatively illustrate a runner turn-off use according to embodiments of this invention.
Figure 2:
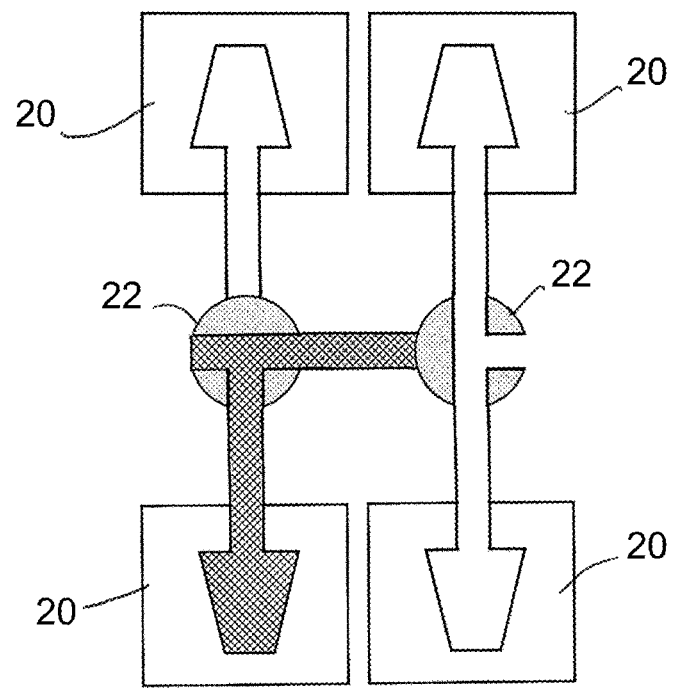

FIGS. 1 and 2 generally illustrate the use of an RTO according to embodiments of this invention. A mold family of four molds 20 is shown, with two RTOs 22 disposed therebetween. In FIG. 1 both RTOs 22 are fully open to allow molten material to flow into the hexagonal mold shapes. In FIG. 2, both RTOs 22 have been rotated to shut off the runners 24 and corresponding gates into three of the molds 20, thereby only allowing one mold 20 to receive material. The T-shaped runner pattern in each RTO 22 is machined into the top surface as needed to correspond to the molding needs.

FIGS. 3-6 show an RTO 30 according to embodiments of this invention. The RTO 30 has a generally cylindrical configuration and is formed of a top ring 32 that is rotatably mounted on a bottom ring 34. The top ring 32 includes a top surface 36 which is machinable to provide a runner pattern such as shown in FIGS. 1 and 2 (and FIGS. 12-16). The top surface 36 includes a hex opening 38 defined to receive a corresponding hex tool (e.g., an Allen wrench). In embodiments, the hex opening 38 has tapered side walls (e.g., a 2° taper), such as for material removal caused by mold flashing. As corresponding tool can be provided with the RTO 30. Other shapes and corresponding tools can be used for the tool opening.

Figure 4:
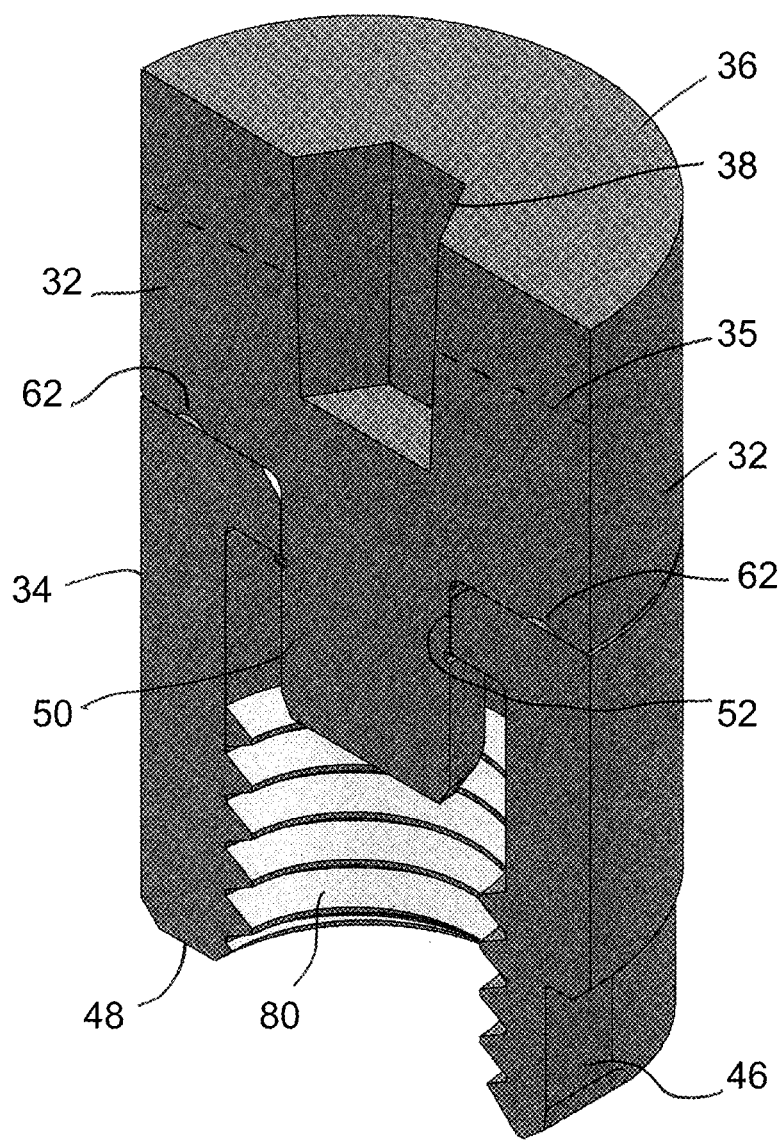

As shown in FIG. 4, the hex opening 38 extends fairly deep into the top ring so that the hex opening 38 is still existent after machining to allow the rotation of the machined top ring 32. Dashed line 35 indicates an approximate machining depth to illustrate that the hex opening 38 extends below the machined runner pattern. In some embodiments, as an example, the maximum machining depth is 0.313 inch.

Figure 3:
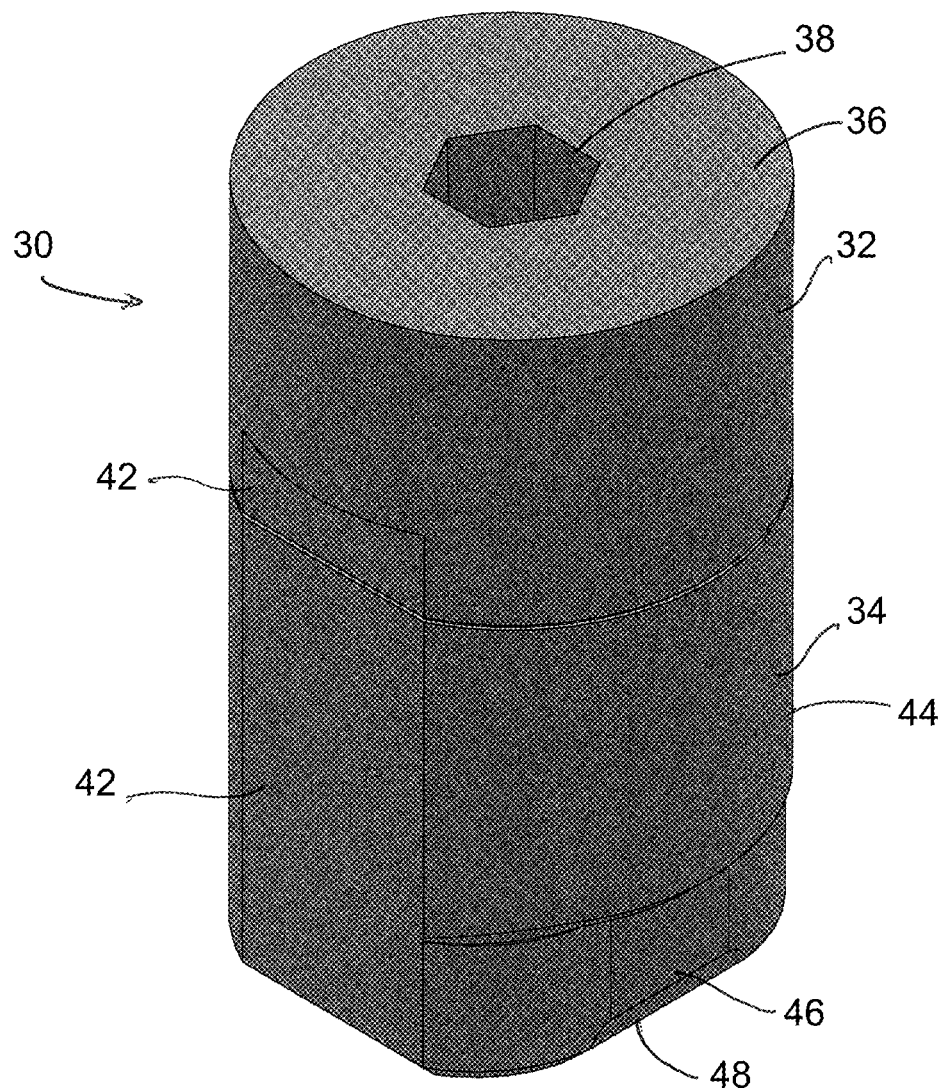
FIGS. 3-6 illustrate a runner turn-off according to embodiments of this invention.

Referring to FIG. 3, the outer cylindrical surface 40 of the RTO 30 includes a pair of opposing machining flats 42 and 44. The machining flats 42 and 44 provide for convenient holding in a vice during machining. The machining flats 42 and 44 extend the full length of the bottom ring 34, and partially into the top ring 32. This allows the rotatable top ring 32 to be secured in the vice for machining. A further press alignment flat 46 is formed at the bottom surface 48 of the bottom ring to promote proper orientation during a press fitting of the RTO 30 into a corresponding mold component. The press flat 46 can be aligned in place and the RTO 30 can, for example, be hit with a mallet to press the RTO 30 into the mold component. The press alignment flat 46 is shown on a different side between the two machining flats 42 and 44, but cam be included elsewhere, such as within one or both of the machining flats 42 and 44. Various sizes shapes and configurations are available for the flats according to this invention.

The diameter for the top ring 32 is slightly smaller than the diameter of the bottom ring 34. In embodiments, the a diameter difference between the top ring 32 and the bottom ring 34 is less than 0.0005 inch, for example about 0.0002 inch. This way, the press alignment flat 46, and the diameter of the bottom ring 34, can be press-fit in location. The top ring 32 however, being slightly smaller, can turn freely, but yet there is not so much clearance that the diameter around the top ring 32 is susceptible to flash sneaking in.

Figure 5:
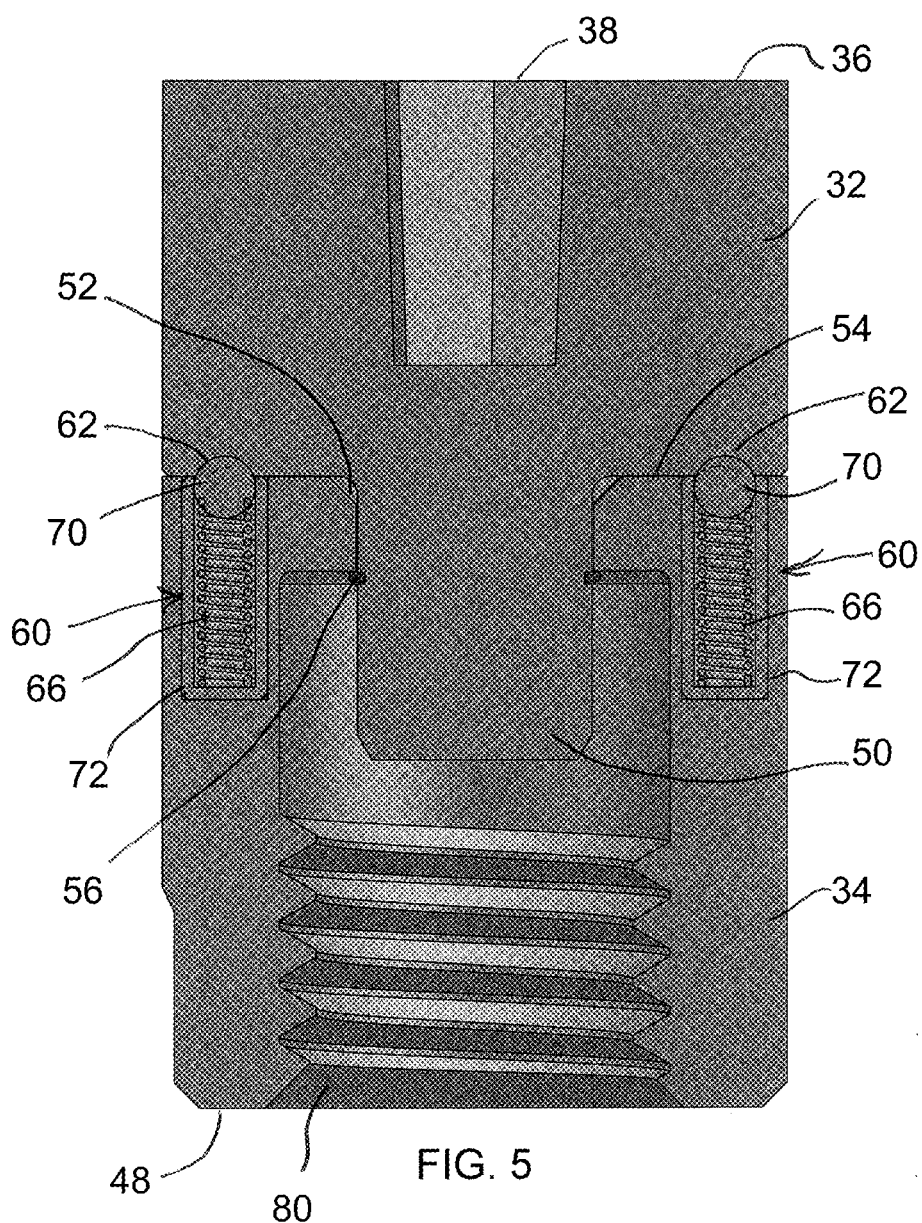

As shown in FIGS. 4 and 5, the top ring 32 includes an extension 50 that is press-fit into, and rotatable within, and opening 52 in a top surface 54 of the bottom ring 34. A sealing and/or securing ring 56 can also be used to keep the top ring 32 in place, particularly during turning.

The RTO 30 includes a detent system 60 for assisting in measured rotations of the top ring 32 and/or securing the top ring 32 in the desired rotation. As illustrated, the detent system 60 includes detents 62 in the bottom surface 64 of the top ring 32, and a spring plunger 66, formed of a spring 68 and rounded top or ball 70, in an opening or slot 72 in the top surface 54 of the bottom ring 34. The detents 62 are spaced apart at desired angular positions about the longitudinal access of the RTO 30. For example, 45° angular positions (8 detents) are presently preferred, but other angles can be used. The balls 70 click in place when aligned with one of the detents 62, and the spring force holding the balls 70 can be overcome using the hex tool to rotate the top ring 32. Various sizes, shapes, and configurations are available for the detent system and components thereof. For example, the elements can be reversed, with the spring plunger in the top ring and the detents in the bottom ring.

Figure 6:
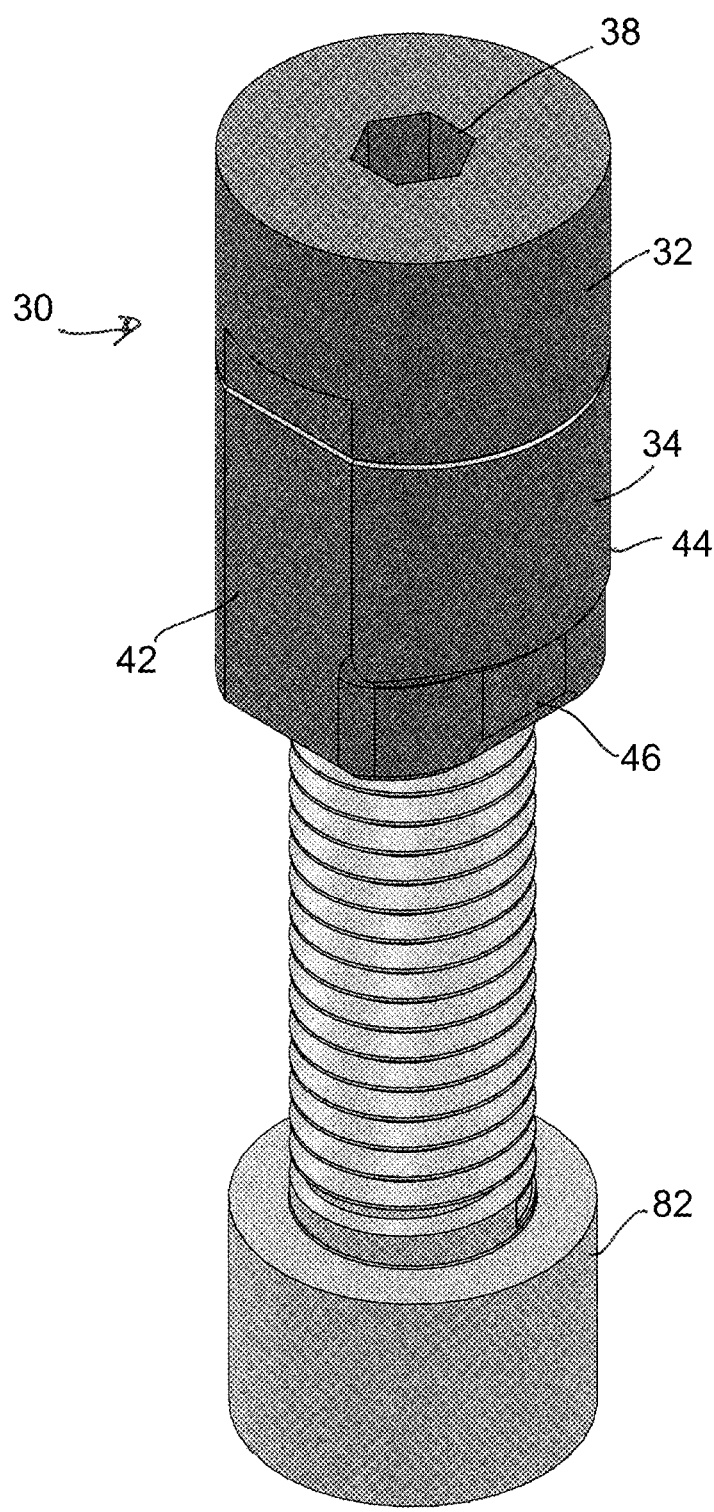

In embodiments of this invention, the bottom ring 34 includes a threaded opening 80 at and extending from the bottom surface 48. As shown, the bottom ring 34 includes a full-length central passageway, that varies in diameter, and is threaded toward the bottom. As shown in FIG. 6, a bolt 82 can be inserted into the opening 80, such as to further secure the RTO 30 into position in a mold component.

The bolt 82 can be solid, or include a longitudinal passage 84 as shown in FIGS. 7 and 8. The longitudinal passage 84 is aligned with an additional passage 88 through the first ring 32. An ejector pin 86, such as shown in FIG. 9, can be inserted (e.g., press-fit) through the passages 84 and 88, such as to end adjacent to and close the bottom of the hex opening 38. The ejector pin 86 seals the passages 84 and 88 and is used, as needed, to remove any plastic material from the hex opening 38 after use to allow tool access to the hex opening 38. The ejector pin 86 extends beyond the bolt 82 (see FIG. 10) and can be tapped to eject hardened material from the hex opening 38. There is a possibility that use of the pin 86 could push the whole RTO 30 upward, but the bolt 82 with passage 84 reduces or eliminates that concern by securing the bottom ring 34 to the mold.

The bolt 82 and/or threaded opening 80 are sized so that the bolt 82 does not reach and push on (and possibly damage) the small inner shank 50 that extends down from the top ring 32. An internal stop or ledge can also be included at the end of the threading to limit the bolt 82.

The threaded opening 80 can also provide additional advantages. For example, the bolt 80 can be removed and a longer bolt installed. This second bolt extends past the corresponding mold component surface and can be hit with a mallet to overcome the press-fit of the RTO 30 for removal of the entire RTO 30.

FIGS. 9 and 10 show comparisons between the 'standard' RTO 30 (FIG. 9) and the ejector style RTO 30 (FIG. 10), according to embodiments of this invention. FIG. 10 further shows an installed ejector pin 86.

FIGS. 12-16 show various and alternative runner patterns or geometries in top surfaces of an RTO according to embodiments of this invention. FIG. 12A shows a T-shaped pattern, with FIGS. 12B-E showing off positions indicated by an X. FIGS. 13A-B show an L-shape pattern, or a 90° elbow turn. FIGS. 14A-B show a straight path. FIGS. 15A-C show a path at 45 degree increments. FIGS. 16A-B show a 135° elbow.

Thus, the invention provides a runner turn-off for a mold with improved features. The RTO provides enhanced machining and more secure rotation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A runner turn-off for a mold, comprising a bottom ring and a top ring rotatable on the bottom ring, the runner turn-off having a generally cylindrical shape with a machining flat on each of two opposing sides of the bottom ring and partially extending into the top ring.

2. The runner turn-off of claim 1, further comprising a press-fit alignment flat formed in the bottom ring on a side between the two opposing sides.

3. The runner turn-off of claim 1, wherein the top ring includes a hex opening in a top surface and configured to receive a hex tool for rotating the top ring relative to the bottom ring.

4. The runner turn-off of claim 3, wherein the top ring is machinable at the top surface to form runners across the hex opening for the mold material, and the hex opening extends into the top ring a predetermined distance to extend below the runners after machining.

5. The runner turn-off of claim 1, further comprising:
a plurality of detents disposed in a bottom surface of the top ring; and
a spring plunger between the top ring and the bottom ring and configured to fit within each of the plurality of detents when aligned.

6. The runner turn-off of claim 5, wherein the plurality of detents are spaced at 45° increments about a longitudinal axis of the runner turn-off.

7. The runner turn-off of claim 1, wherein the top ring includes an extension press-fit into an opening of the bottom ring.

8. The runner turn-off of claim 1, wherein the top ring has a smaller diameter than the bottom ring, and the bottom ring is press-fit into an opening in the mold.

9. The runner turn-off of claim 8, wherein a diameter difference between the top ring and the bottom ring is less than 0.0005 inch.

10. The runner turn-off of claim 1, wherein the bottom ring includes a threaded opening on a side opposite the top ring.

11. The runner turn-off of claim 10, further comprising a threaded fastener corresponding to the threaded opening and for securing the bottom ring to the mold.

12. The runner turn-off of claim 11, wherein the threaded fastener includes a longitudinal passage, and further comprising an ejector pin configured to extend into the passage and contact the top ring.

13. A runner turn-off for a mold, comprising:
a cylindrical body including a bottom ring and a top ring rotatable on the bottom ring;
a plurality of detents disposed in one of a bottom surface of the top ring or a top surface of the bottom ring; and
a spring plunger between the top ring and the bottom ring and configured to
fit within each of the plurality of detents when aligned; and
a pair of parallel machining flats on opposing sides of the cylindrical body, each of the machining flats extending across the bottom ring and partially across the top ring.

14. The runner turn-off of claim 13, wherein the plurality of detents are spaced at 45° increments about a longitudinal axis of the runner turn-off.

15. The runner turn-off of claim 13, wherein the bottom ring includes a slot enclosing the spring plunger.

16. The runner turn-off of claim 13, further comprising:
a hex opening in a top surface of the top ring, configured to receive a hex tool for rotating the top ring relative to the bottom ring;
wherein the top ring is machinable at the top surface to form runners across the hex opening for the mold material, and the hex opening extends into the top ring a predetermined distance to extend below the runners after machining.

17. The runner turn-off of claim 13, wherein the top ring includes an extension press-fit into an opening of the bottom ring, the bottom ring includes a threaded opening on a side opposite the top ring, and further comprising:
a threaded fastener corresponding to the threaded opening and for securing the bottom ring to the mold, wherein the threaded fastener includes a longitudinal passage; and
an ejector pin configured to extend into the passage and contact the extension of the top ring.

18. A method of using the runner turn-off of claim 17, comprising:
machining a runner pattern into a top surface of the top ring;
press-fitting the runner turn-off into a mold;
turning the top ring relative to the bottom ring into a selected position to open and close runners in the runner pattern, wherein the spring plunger fits into one of the detents to secure the top ring in the selected position.

19. The method of claim 18, further comprising:
inserting the ejector pin through the longitudinal passage to remove the top ring from the bottom ring; and/or
threading a second and longer fastener to the bottom ring, wherein the second and longer fastener extends from the mold, and hitting the fastener to remove the runner turn-off from the mold.

* * * * *